US012437844B2

(12) United States Patent
Warren

(10) Patent No.: US 12,437,844 B2
(45) Date of Patent: Oct. 7, 2025

(54) GENOMIC DATA ANALYSIS SYSTEM AND METHOD

(71) Applicant: ILLUMINA, INC., San Diego, CA (US)

(72) Inventor: Andrew Warren, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 1172 days.

(21) Appl. No.: 16/495,015

(22) PCT Filed: Mar. 29, 2018

(86) PCT No.: PCT/US2018/025249
§ 371 (c)(1),
(2) Date: Sep. 17, 2019

(87) PCT Pub. No.: WO2018/183745
PCT Pub. Date: Oct. 4, 2018

(65) Prior Publication Data
US 2020/0013485 A1    Jan. 9, 2020

Related U.S. Application Data

(60) Provisional application No. 62/479,058, filed on Mar. 30, 2017.

(51) Int. Cl.
*G16B 45/00* (2019.01)
*G16B 20/20* (2019.01)
*G16B 30/00* (2019.01)

(52) U.S. Cl.
CPC ........... *G16B 45/00* (2019.02); *G16B 20/20* (2019.02); *G16B 30/00* (2019.02)

(58) Field of Classification Search
None
See application file for complete search history.

(56) References Cited

U.S. PATENT DOCUMENTS

| | | | |
|---|---|---|---|
| 5,528,050 | A | 6/1996 | Miller et al. |
| 5,719,391 | A | 2/1998 | Kain |
| 8,158,926 | B2 | 4/2012 | Feng et al. |
| 8,241,573 | B2 | 8/2012 | Banerjee et al. |
| 2005/0066276 | A1 | 3/2005 | Moore et al. |
| 2012/0270305 | A1 | 10/2012 | Reed et al. |
| 2013/0023422 | A1 | 1/2013 | Feng et al. |
| 2013/0260372 | A1 | 10/2013 | Buermann et al. |
| 2014/0115515 | A1 | 4/2014 | Adams |
| 2016/0292356 | A1 | 10/2016 | Kim et al. |

FOREIGN PATENT DOCUMENTS

| | | |
|---|---|---|
| WO | WO 13/166517 | 11/2013 |
| WO | WO 2015/054080 | 4/2015 |

OTHER PUBLICATIONS

Ye, Hao et al. "Alignment of Short Reads: A Crucial Step for Application of Next-Generation Sequencing Data in Precision Medicine." Pharmaceutics 7.4 (2015): 523-541. Web. (Year: 2015).*
Yuan, Bo et al. "Comparative Genomic Analyses of the Human NPHP1 Locus Reveal Complex Genomic Architecture and Its Regional Evolution in Primates: E1005686." PLoS genetics 11.12 (2015): n. pag. Web. (Year: 2015).*
Torri, Federica et al. "Next Generation Sequence Analysis and Computational Genomics Using Graphical Pipeline Workflows." Genes 3.3 (2012): 545-575. Web. (Year: 2012).*
Abeel, Thomas et al. "GenomeView: a Next-Generation Genome Browser." Nucleic acids research 40.2 (2012): e12-e12. Web. (Year: 2012).*
Thorvaldsdóttir, H., Robinson, J. T., & Mesirov, J. P. (2013). Integrative Genomics Viewer (IGV): high-performance genomics data visualization and exploration. Briefings in bioinformatics, 14(2), 178-192. (Year: 2014).*
Robinson, James T et al. Integrative Genomics Viewer (IGV). (Oct. 2016) (Year: 2016).*
Krzywinski (2011) "Genome Visualization with Circos Session 1—Introduction to Circos and Visualization Guidelines") https://circos.ca/tutorials/course/circos-s1-handout.pdf (Year: 2010).*
Rausch et al., 2012, DELLY: structural variant discovery by integrated paired-end and split-read analysis, Bioinformatics, 28:i333-i339.
Rimmer et al., Aug. 2014, Integrating mapping-, assembly- and haplotype-based approaches for calling variants in clinical sequencing applications, Nature Genetics, 46(8):912-918.
Saunders et al., 2012, Strelka: accurate somatic small-variant calling from sequenced tumor-normal sample pairs, Bioinformatics, 28(14):1811-1817.
International search report and written opinion dated Jul. 11, 2018 in application No. PCT/US2018/025249.
Juan et al., May 5, 2014, The personal genome browser: visualizing functions of genetic variants, Nucleic Acids Research, 42:W192-W197.
Haoyang, Cai et al. "ArrayMap: A Reference Resource for Genomic Copy Number Imbalances in Human Malignancies," Cornell University Library, vol. 7, Issue 5, Jan. 11, 2012, pp. 2-12.
Loraine, Anne E et al. "Visualizing the Genome: Techniques for Presenting Human Genome Data and Annotation," BioMed Central, vol. 3, No. 1, Jul. 30, 2002, pp. 1-8.
Pavlopoulos, Georgios A et al. "Visualizing genome and systems biology: technologies, tools, implementation techniques and trends, past, present and future," Gigascience, vol. 4, No. 1, Aug. 25, 2015, pp. 1-28.

* cited by examiner

*Primary Examiner* — Karlheinz R. Skowronek
*Assistant Examiner* — Josep Pulliam
(74) *Attorney, Agent, or Firm* — Knobbe, Martens, Olson & Bear, LLP

(57) ABSTRACT

Embodiments relate to methods and systems for analyzing genomic data, such as genetic variants. Some embodiments relate to the efficient analysis and presentation of certain genetic variants of an individual.

12 Claims, 10 Drawing Sheets

208

VARIANTS FILTER FOR SV
  GENERAL
  POPULATION FREQUENCY
  CONSEQUENCE AND IMPACT

210

SV/CNV POPULATION FILTERS

OVERLAPPING DATABASE VARIANTS
    FILTER FOR VARIANTS WHERE EXTERNAL
    DATABASES CONTAIN STRUCTURAL VARIANTS
    THAT OVERLAP BY MORE THAN THIS FRACTION

RECIPROCAL OVERLAP (0.00-1.00)

CLINGEN
    ☐ PETNOGENIO
    ☐ LIKELY PATH
    ☐ VUS
    ☐ LIKELY BENIGN
    ☐ BENIGN

POPULATION FREQUENCIES
    DGV
    EXCLUDE VARIANTS WHERE ≥ (0.000000-1.000000)
    OF OVERLAPPING VARIANTS ARE COMMON, I.E. HAVE
    POPULATION FREQUENCY ≥ (0.000000-1.000000)

1000 GENOMES
    EXCLUDE VARIANTS WHERE ≥ (0.000000-1.000000) OF
    OVERLAPPING VARIANTS ARE COMMON, I.E. HAVE
    POPULATION FREQUENCY > (0.000000-1.000000)

FIG. 6C

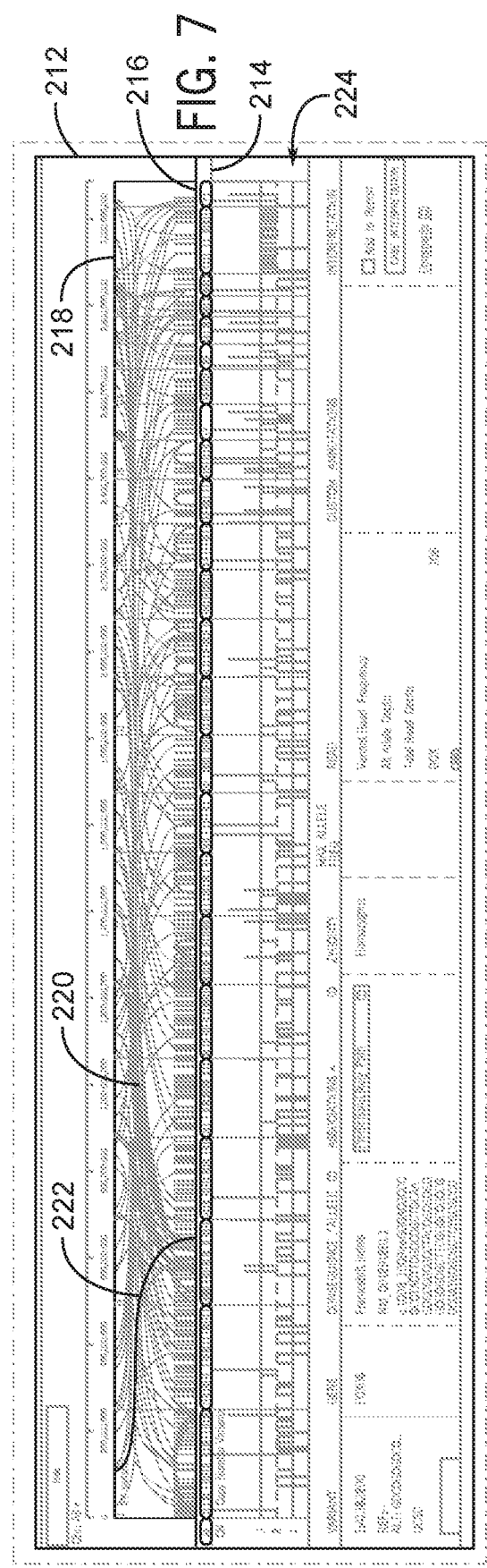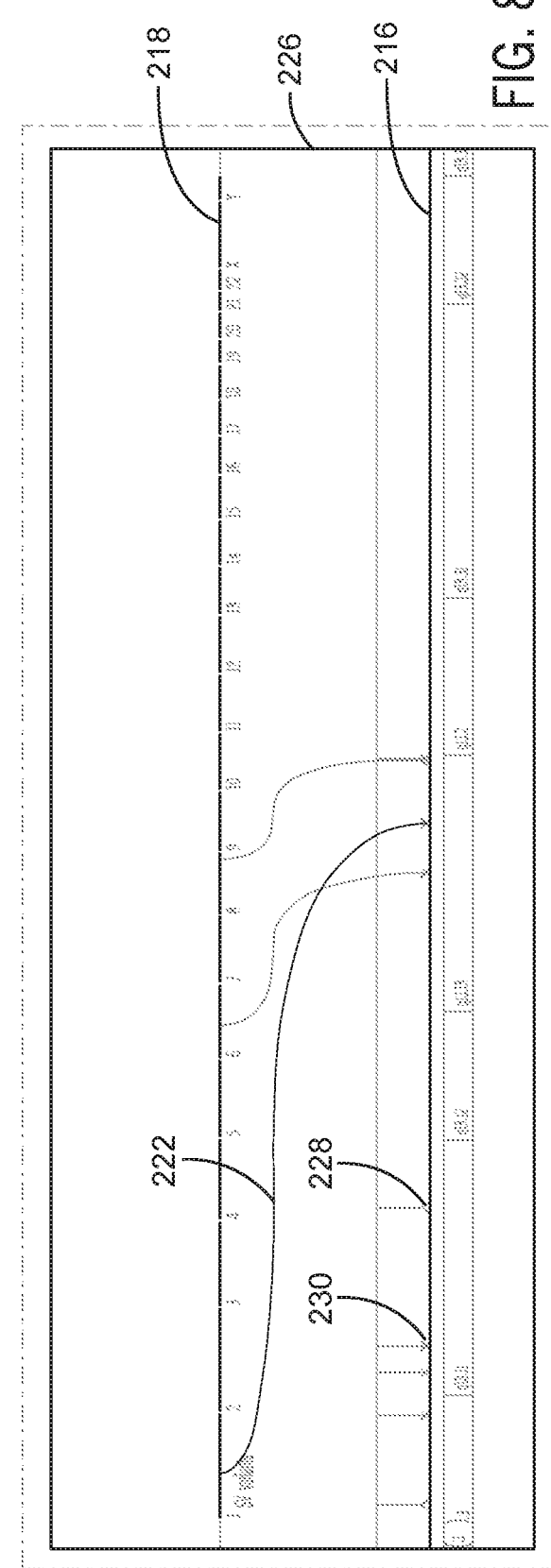

GENOMIC DATA ANALYSIS SYSTEM AND METHOD

CROSS-REFERENCE TO RELATED APPLICATIONS

This application is the U.S. National Phase of PCT Application No. PCT/US2018/025249 filed on Mar. 29, 2018 which published in English as WO 2018/183745 on Oct. 4, 2018 which claims priority to U.S. Prov. App. No. 62/479,058 filed Mar. 30, 2018 entitled "GENOMIC DATA ANALYSIS SYSTEM AND METHOD" which is incorporated by reference herein in its entirety.

FIELD OF THE INVENTION

Embodiments relate to methods and systems for analyzing genomic data, such as genetic variants. Some embodiments relate to the efficient analysis and presentation of certain genetic variants of an individual.

BACKGROUND OF THE INVENTION

Increasingly sophisticated systems have been developed for determining genomic information and for analyzing the information to determine a range of characteristics of interest. Such systems may allow for processing of samples of genetic material, performing nucleotide sequencing, such as next generation sequencing, on the material. These systems may also include an informatics component designed to piece together extended sections of nucleotide sequences from the genetic material, and ultimately to determine sequences of entire chromosomes and genomes of individuals.

One aspect of a genetic analysis involves determining genetic variations. Different types of variations include insertions, deletions, substitutions, duplications, translocations, and inversions. Challenges currently faced in genomic analysis include the identification and classification of genetic variations, presentation of genetic variations to human researchers and clinicians, and manipulation of the data in ways that are most informative and instructive to users.

SUMMARY OF THE INVENTION

Some embodiments include a computer-implemented method for displaying genetic variation data, comprising: receiving genetic variation data from genomic sequence data of an individual; creating an index of documents for the determined genetic variation data; receiving a selection from a user for at least one filter from a plurality of filters for features of interest in the genetic variation data; searching the index based upon the selected filter to generate filtered genetic variants for the individual; identifying a genetic variant that is a translocation along with a first and second point, the first point being the location of a first breakpoint of the translocation on a first axis, and the second point being the location of a second breakpoint of the translocation mapped on a second axis comprising a linear representation of a genome; and displaying on a display device a browser page that displays the filtered genetic variants of the individual, wherein the browser page comprises a first map comprising the first axis comprising a linear representation of a genome having the locations of the genetic variants mapped thereon, and wherein different types of genetic variants are identified by different icons, wherein for translocation genetic variants, the browser page displays the first and second point connected using a straight or curved line. Some embodiments also include determining the genetic variation data from the individual.

Some embodiments also include displaying a second map comprising an enlarged view of the first axis, and a non-enlarged view of the second axis. In some embodiments, the second map is reached directly from the first map. In some embodiments, the different icons are each selectable to launch the second map.

Some embodiments also include highlighting a translocation when a user hovers over or selects a corresponding translocation. Some embodiments also include displaying a popup window of details of a genetic variant when a user selects the icon for the genetic variant.

In some embodiments, the genetic variation data is stored at a location remote from a server that performs the search.

In some embodiments, determining genetic variation data comprises calling a plurality of variant identification tools. Some embodiments also include creating annotated genetic variation data with the variation identification tools, wherein the annotated genetic variation data comprises at least one feature selected from the group consisting of a type of genetic variant, a locus of a genetic variant, and a quality score for a genetic variant.

In some embodiments, the filters selectively provide genetic variants associated with at least one feature selected from the group consisting of a whole genome, a chromosome, a type of genetic variant, a quality metric, a clinical indication, a population frequency, and an overlapping database variant. In some embodiments, the clinical indication is a phenotype associated with a genetic variant.

In some embodiments, creating an index comprises creating an inverted index. In some embodiments, searching the index comprises searching the inverted index.

In some embodiments, the genetic variants comprise at least one variant selected from the group consisting of an inversion, a deletion, an insertion, a duplication, a substitution, and a translocation.

Some embodiments include an electronic system for analyzing genetic variation data, comprising: an informatic module running on a processor and adapted to determine genetic variation data from genomic sequence data from an individual; an indexing module adapted to create an index of documents in a memory for the determined genetic variation data; a selection module adapted to present a browser page that displays a plurality of filters available for features of interest in the genetic variation data, and to receive a selection from a user for at least one filter from the plurality of filters; a search module adapted to search the index based upon the selected filter and to generate filtered genetic variants for the individual; an identification module adapted to identify a genetic variant that is a translocation along with a first and second point, the first point being the location of a first breakpoint of the translocation on a first axis, and the second point being the location of a second breakpoint of the translocation mapped on a second axis comprising a linear representation of a genome; and a browser module adapted to return a browser page that displays the filtered genetic variants of the individual, wherein the browser page comprises a first map comprising a first axis comprising a linear representation of a genome having the locations of the filtered genetic variants mapped thereon, and wherein different types of filtered genetic variants are identified by different icons, wherein for a translocation genetic variant, the browser page displays a first and second point connected using a straight or curved line.

In some embodiments, the returned browser page displays a second map comprising an enlarged view of the first axis, and a non-enlarged view of the second axis. In some embodiments, the second map is reached directly from the first map. In some embodiments, the different icons are each selectable to launch the second map.

In some embodiments, the returned browser page highlights the translocation when a user hovers over or selects a corresponding translocation. In some embodiments, the returned browser page displays a popup window of details of a genetic variant when a user selects the icon for the genetic variant.

In some embodiments, the genetic variation data is stored at a location remote from a server that performs the search.

In some embodiments, the informatic module is adapted to call a plurality of variant identification tools.

In some embodiments, the variation identification tools create annotated genetic variation data comprising at least one feature selected from the group consisting of a type of genetic variant, a locus of a genetic variant, and a quality score for a genetic variant.

In some embodiments, the filters selectively provide genetic variants associated with at least one feature selected from the group consisting of a whole genome, a chromosome, a type of genetic variant, a quality metric, a clinical indication, a population frequency, and an overlapping database variant. In some embodiments, the clinical indication is a phenotype associated with a genetic variant.

In some embodiments, the indexing module adapted to create an inverted index. In some embodiments, the search module is adapted to search the inverted index.

In some embodiments, the genetic variants comprise at least one variant selected from the group consisting of an inversion, a deletion, an insertion, a duplication, a substitution, and a translocation.

Some embodiments include an electronic method for displaying a browser page summarizing genetic variants, comprising: determining genetic variation data from genetic sequence data for a whole genome of an individual; creating a whole genome index of documents for the determined genetic variation data of the whole genome; presenting a browser including a plurality of filters available for features of interest in the genetic variation data; receiving a user selection of at least one of the filters; searching the whole genome index based upon the selected filter or filters; and displaying a browser page summarizing genetic variations responding to the selected filter or filters.

In some embodiments, the genetic variation data is stored at a location remote from a server that performs the search.

In some embodiments, the genetic variations include at least one structural variant. In some embodiments, the structural variant comprises at least one of an inversion, a deletion, an insertion, a duplication, and a translocation.

In some embodiments, determining genetic variation data comprises calling a plurality of variant identification tools to identify likely variations and variation loci. In some embodiments, the variation identification tools create annotated genetic variation data that is used in the searching, the annotated genetic variation data comprising at least a type of variation, a locus of each variation, and a quality score for each identified variation.

In some embodiments, the plurality of filters comprises filters applicable selectably for one or more chromosomes and up to the whole genome, and including at least one of a type of variation, quality metrics, overlapping database variants, clinical filters, and population frequencies.

In some embodiments, the searching is performed by creating an inverted index of the documents and performing the search on the inverted index.

In some embodiments, displaying the browser page comprises formatting the browser page by representing a type and location of the variations via icons for each type of variation. In some embodiments, the icons are placed on a mapping of the whole genome of the individual at the locus of each represented variation. In some embodiments, for each translocation variation the mapping comprises an axis indicating a locus of the variant break-end, an axis indicating a locus of the matching break-end, and a line or a curved line joining the two break-ends. Some embodiments also include automatically drawing a Bezier curve joining each expected locus and each actual locus of each translocation variation. Some embodiments also include highlighting a translocation variation mapping when a user hovers over or selects a corresponding translocation variation. Some embodiments also include zooming the mapping based upon user input, and wherein the zooming alters the scale of the break-end locus axis, while not altering the scale of the matching break-end locus axis. Some embodiments also include displaying a popup window of details of a particular variation when a user selects the icon for the particular variation.

BRIEF DESCRIPTION OF THE DRAWINGS

FIG. 6C depicts a portion of a browser screen including a filter selection window that includes various population filters.

FIG. 7 depicts a presentation of mapping of the occurrence of genomic variations along the whole genome in a browser page, and includes indications for certain genetic variations at a first locus, and indications for certain second loci related to the first loci.

FIG. 8 depicts a browser page that includes a magnified view of a portion of the browser page depicted in FIG. 7.

DETAILED DESCRIPTION

Embodiments relate to methods and systems for analyzing and presenting genomic data, such as data indicative of genetic variations. Some embodiments include determining genetic variation data from genetic sequence data for a whole genome of an individual, and creating a whole genome index of documents for the determined genetic variation data of the whole genome. In some embodiments, the system may include a graphical user interface that includes a browser which presents a plurality of filters available for features of interest in the genetic variation data. In some embodiments, a user selection is received from the browser of at least one of the filters, and the whole genome index is searched based upon the selected filter or filters. In some embodiments, a browser page is then returned summarizing genetic variations responding to the filter or filters.

Certain embodiments relate to efficient analysis and presentation of complex genetic variation data from an individual. Traditional techniques to visualize genetic variants in a genome are often incapable of presenting certain genetic variants at a high resolution while maintaining a visualization of the association of such variants with other locations within a genome. Genetic variants, such as translocations, include a first breakpoint at a first location in a genome, and a second breakpoint at a second location in the genome. In some embodiments, a map of genetic variants in a genome can include a linear representation of a genome on a first axis. The map can also include a second axis. A first breakpoint of a translocation can be mapped to the first axis, and the second breakpoint of the translocation can be mapped to the second axis, and the two breakpoints can be joined by a line or curve in the visualization. In some embodiments, a first breakpoint of a translocation mapped on the first axis can be magnified or enlarged to observe its features and location in the genome at a higher resolution on the first axis. In some such embodiments, the scale of the second axis can be unchanged. Thus, the first breakpoint can be readily and efficiently visualized at a high resolution while maintaining a visualization of the association of the translocation with its second breakpoint at another location within the genome.

Figure 1:
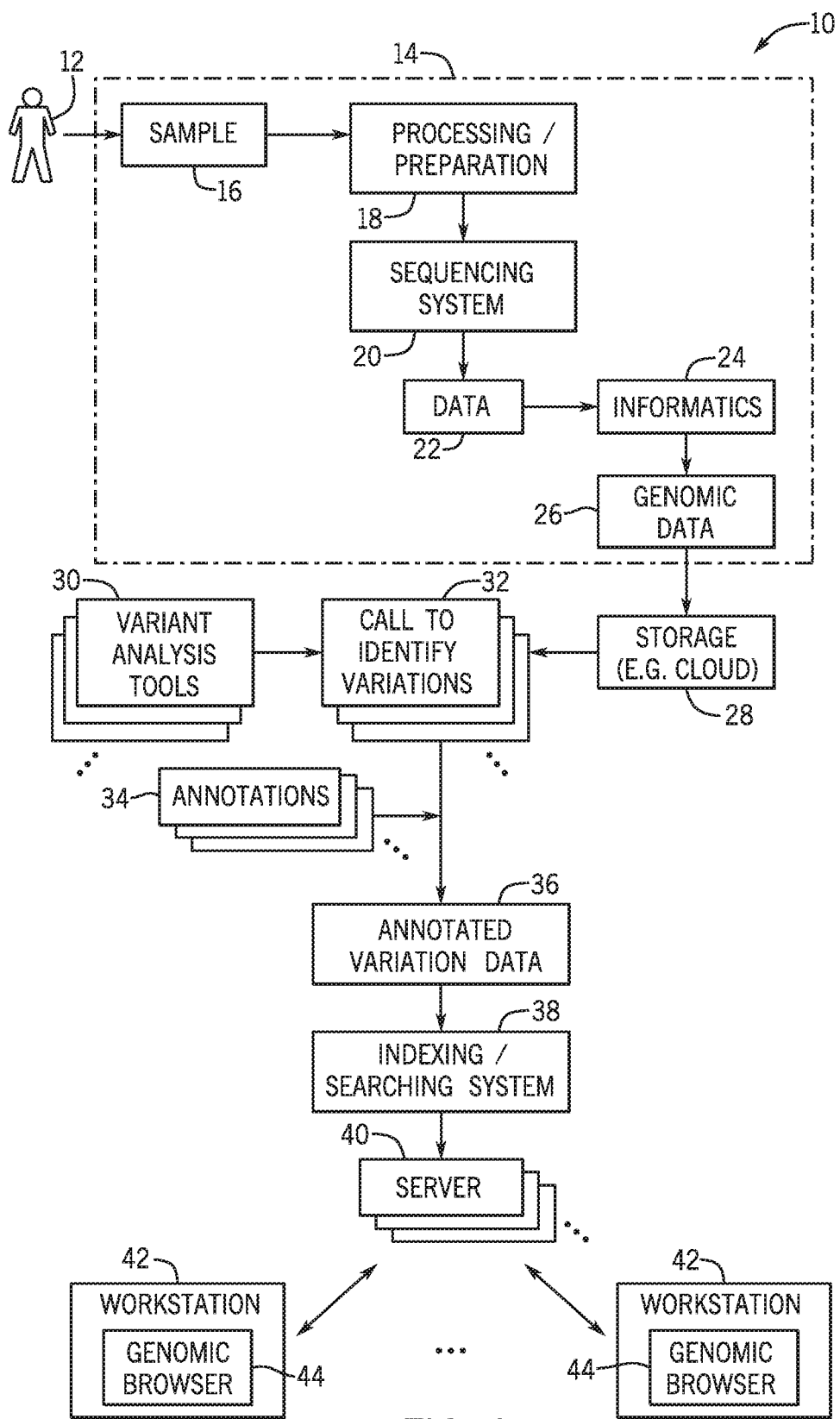
FIG. 1 depicts an embodiment of a genetic analysis system that determines and reports genomic information.

An embodiment of a genetic analysis system is depicted in FIG. 1. In FIG. 1, a genetic analysis system 10 determines information for an individual 12. As used herein, an "individual" can provide a source of a sample 16, and can include a single subject, such as an animal, mammal, human, plant, or microbe. In some embodiments, a sample can be obtained from a variety of sources such as a cell, cell-line, tissue, plurality of individuals, such as a population, or an environmental source. To first obtain the genetic information on which analysis is performed, a genetic data acquisition system 14 may be utilized in which the sample 16 from the individual is submitted for analysis. In some embodiments, the sample may be prepared for processing such as via a patterned array. In the illustrated embodiment, the system is designed to introduce molecules, such as nucleotides, oligonucleotides, and other bioactive reagents into a flow cell, for example, in which the sample 16 has been disposed in advance in the preparation operations via a processing/preparation system 18. The system may be designed for synthesizing biopolymers, such as DNA chains from the sample, and advantageously can sequence the entire genome of the individual donor of the sample. However, it should be borne in mind that the present technique is not limited in any way to any particular sequencing operations, gene expression operations, diagnostic applications, or any one of these, but may be used with any of them for analyzing collected genomic data of a sample. In the illustrated embodiment, however, example biopolymers might include, but are not limited to, nucleic acids, such as DNA, RNA or analogs of DNA or RNA.

It should also be borne in mind that the analysis and reporting aspects disclosed herein, such as those relating to determining, analyzing, searching, reporting, and so forth of genetic variations may be performed entirely in post-processing based upon data already obtained and stored, such as from any sort of acquisition system, including that described briefly here.

In the diagrammatical representation of FIG. 1, the data acquisition system 14 may include a sequencing system 20 designed to receive and process the prepared sample, such as on a biological patterned array, and to generate image data representative of individual sites on the patterned array. A data analysis system with the sequencing system receives the image data and processes the image data, to extract meaningful information from the imaging data. The image data, the processed data, or both may be stored, as indicated by data block 22 in FIG. 1. Downstream processing systems, such as an informatics system 24 shown in FIG. 1, may further analyze the image data or the data derived from the image data, such as to determine sequences of molecules making up the analytes of the sample, such as nucleotide sequences and/or lengths of nucleic acids such as DNA, or RNA, and compile sequencing lists. In some embodiments, the informatics system or systems determine extended sequences of molecules, such as nucleotide sequences, of the subject genome, and produce whole genome listings, including listings for all chromosomes of the individual, from which genetic variations are determined and analyzed as described herein.

In some embodiments, the sample 16 comprises nucleic acids. In some embodiments, processing/preparing the sample can include preparing a nucleic acid library comprising nucleic acid fragments from the sample. In some embodiments, the sequencing system 20 can include extending primers hybridized to the nucleic acid fragment to obtain data 22 comprising nucleic acid sequence data. In some embodiments, performing informatics using the informatics component 24 on the nucleic acid sequence data can generate genomic data 26. In some embodiments, performing informatics on the nucleic acid sequence data can include determining a consensus nucleic sequence from the nucleic acid sequence data, and/or comparing the nucleic acid sequence data to a model nucleic acid sequence. In some embodiments, the model nucleic acid sequence can include at least a portion of a genome, such as the nucleic acid sequence of a chromosome. The model nucleic acid sequence can be a reference genome. In some embodiments, performing informatics on the nucleic acid sequence data can include determining a haplotype nucleic acid sequence. In some embodiments, the genomic data can be stored, for example in a digital form on a local or remote storage medium.

Many different sequencing and informatics systems may be used for the system 14, and these may vary in technology, sample preparation, sample processing, detection techniques, and so forth. In an embodiment of such a system, the sequencing system 20 may employ a flowcell based sample processing system in which a fluidics system introduces reagents and other fluids into a flow cell where the prepared sample is disposed. Reactions at sites in an array in the flow cell are promoted, and images are successively obtained for the sites as hybridized lengths of genetic material at each site are sequenced. Such operations may be cyclic and include an extension, flushing, imaging and de-blocking, and so forth for each of a number of subsequent cycles until sequencing is complete. Examples of nucleic acid sequencing systems useful with embodiments provided herein are disclosed in in U.S. Pat. App. Pub Nos. 2012/0270305 A1; 2013/0023422 A1; and 2013/0260372 A1; and U.S. Pat. Nos. 5,528,050; 5,719,391; 8,158,926 and 8,241,573, each of which is incorporated herein by reference in its entirety. Moreover, commercially available equipment for such sequencing and data analysis is available under the designation MiSeq, HiSeq, NovaSeq, NextSeq, and MiniSeq (Illumina, Inc., San Diego, CA).

The resulting genomic data 26 can be placed in storage 28 in a data repository at a local or remote location, such as in a cloud service. From the data repository, further analysis of the genomic data may be performed, such as to determine, analyze, and report genetic variations as described below. Variant analysis tools 30 may be used to further analyze the genomic data. The variant analysis tools may be local components of the system, or may be remote components available via a network, such as the Internet, and may be provided as a service that is accessed for a particular analysis. The variant analysis tools permit the stored genomic data to be analyzed to identify variations in the genome. The analysis may include using a tool comprising a software or hardware routine 32 that performs a call to identify variations in the genomic data. In some embodiments, a plurality of software routines can be performed for a plurality of calls to identify variants in the genomic data. In some embodiments, one or multiple such software routines may be used and many thousands or millions of calls may be performed. In some embodiments, tools comprising software routines may include commercially available tools such as the Manta Structural Variant Caller (Illumina, Inc., San Diego CA). In some embodiments, such tools are available online, and can perform multiple different analysis techniques to identify the structural variants from mapped paired-end sequence reads, such as will be provided in the stored genomic data. In some embodiments, such tools may identify candidate structural variants from discordant pair and split-read alignments, then perform local assembly and realignment to refine candidates. Other tools used to identify genetic variants may include the Canvas Copy Number Variant Caller (Illumina, Inc., San Diego CA) which permits identification of copy number variants from diploid samples or matched pairs of tumor and normal samples. Still other "callers" or tools used in this process may include, for example, Strelka (Sunders, C T., et al., Bioinformatics. 2012 28:1811-7) which can identify single nucleotide and other small genetic variations, as well as many other callers, such as those sometimes referred to by the commercial designations GATK which includes a haplotype caller (Broad Institute, Cambridge, MA), Platypus (Rimmer, A., et al., Nature Genetics (2014) doi:10.1038/ng.3036), MuTect (Broad Institute, Cambridge, MA), and Delly (Rausch T., et al., Bioinformatics. 2012 28: i333-i339.). Advantageously, some embodiments may include multiple calls or tools to identify structural variants in the genomic data, thereby permitting compilation of very large numbers of identified structural variants, verification or comparison of the quality and probability of such identification, and so forth.

In some embodiments, the "calls" identified by the routine 32 of FIG. 1 will result in variation data. The variation data can include multiple types of identified structural variants which may also be referred to as "calls". These calls correspond to the location of identified structural variants in certain chromosomes, including more than one loci for certain translocations, and optional quality metrics in each of the identified variants. Based upon such variation data, the genomic data takes in annotations 34 that include variation identification data and related meta-data, resulting in annotated variation data 36. Such annotations may also be made via commercially available tools, such as a clinical-grade variant annotation resource NImble and Robust VAriant aNnotAtor (Nirvana) tool (Illumina, Inc. San Diego, CA). Such tools may provide structured JavaScript Object Notation (JSON) data exchange formats. In some embodiments, the annotations in the annotated variation data 36 may include, for example, indications of overlapping genes, overlapping database genomic variants (DGV), overlapping 1000G structural variants, pathogenicity calls from resources such as ClinGen (available from the U.S. National Institutes of Health), variant type such as translocation break-end, variant size such as length in bases, variant filters, paired reads, split reads, somatic quality scores, and so forth. Such annotated variation data may be stored in any desired location or in multiple locations for later accessing and analysis as set forth below.

In some embodiments, an indexing and searching system 38 may create useful databases, indices based upon the annotated variation data 36. The indexing/searching system 38 may search the databases and indices for identification, understanding, and use of the variant identifications and related data. In some embodiments, the indexing and searching system can be local or remote, such as accessing resources online, such as dedicated indexing, searching and analysis tools based upon Apache Lucene, such as Elasticsearch, available from Elastic of Mountain View, CA As described herein, the indexing of the annotated variation data may comprise creation of many, such as millions, of documents for the individual variants, and inversion of the index to facilitate searching, including searching based upon many different filters that may be defined by or selected by users.

In some embodiments, to facilitate ready access to the indexing and searching tools, one or more servers 40 may host sites that provide browser-based interfaces for users at workstations 42. The servers may be accessed by the workstations by any desired network protocol and technologies, such as via an Internet website. Where desired, such access and/or searching may be provided on a controlled-access basis, a subscription basis, a pay-per-use basis, or any other useful community or business structure or scheme. A genomic browser is spawned by the workstation and content delivered by the servers, including pages for accessing genomic data for particular individuals, populations, or any other source of the genetic sample, and for selecting search parameters, filters, and so forth, and then for further accessing related information on the genomic variation of the donor.

Figure 2:
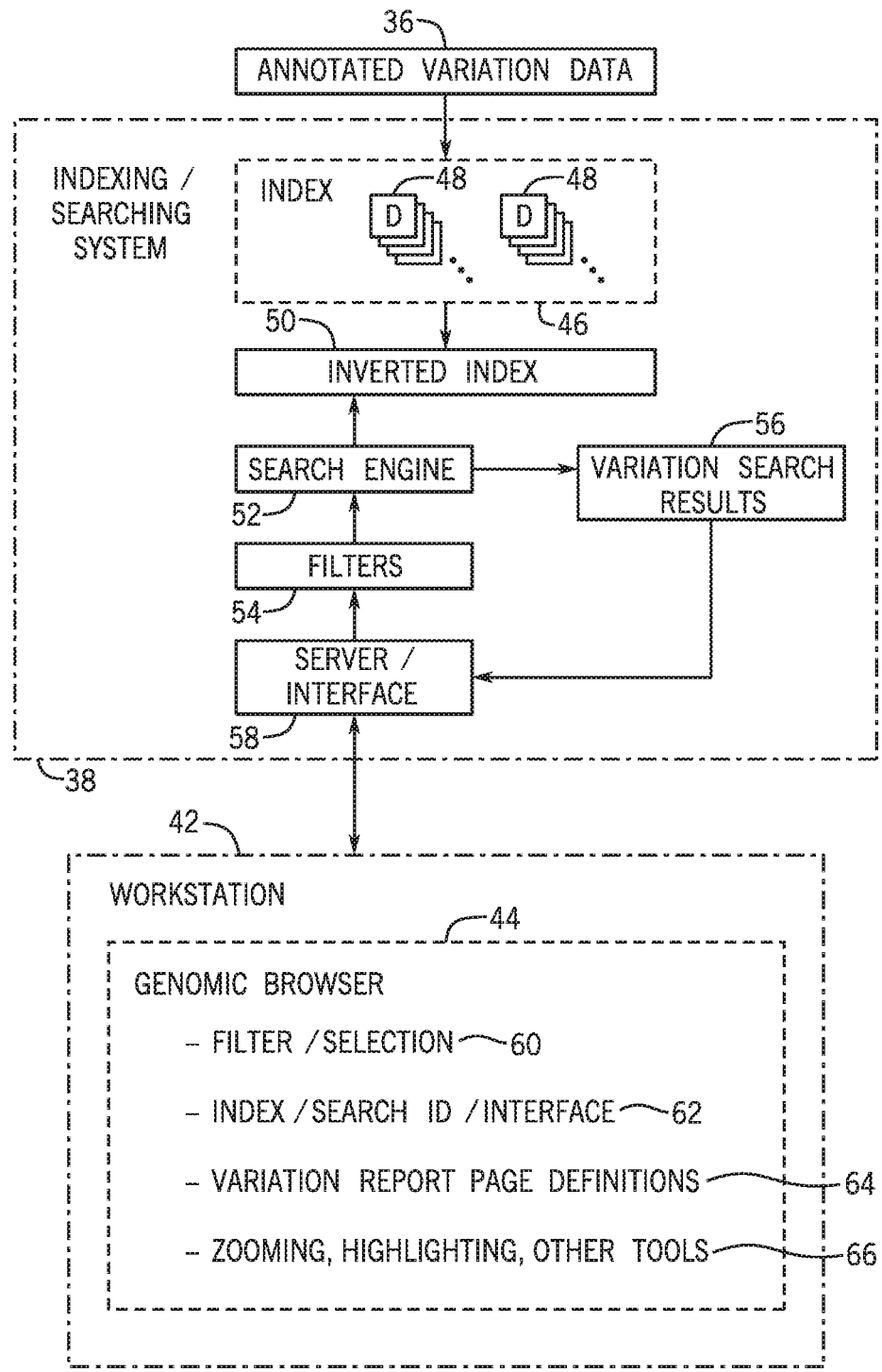
FIG. 2 depicts an embodiment of a genetic information analysis system.

An embodiment of the indexing and searching system 38 and workstation 42 is depicted in FIG. 2. In FIG. 2, the system 38 can store or access the annotated variation data 36 and perform operations on the data, including indexing through the use of an index 46. Such indexing may create individual documents 48 in the index 46 corresponding to the different variants determined by the identification tools, and identified by the annotations and related meta-data. In some embodiments, the documents may be typed JavaScript Object Notation (JSON) documents, and an index application programming interface (API) may add or update the documents in the index to facilitate searching. In some embodiments of a whole genome analysis, and particularly of variants in the entire genome of an individual, many hundreds of thousands or millions of documents may be included in the index, and an index containing such documents may be created for each individual or donor of a sample.

In some embodiments, the index may be inverted and stored in an inverted index 50. Such inversion may create an index data structure that stores a mapping of the documents to locations on a disk or in a file. Such inversion may greatly facilitate fast searching in accordance with various filters that may be selected by the user as described herein.

In some embodiments, the indexing and searching system 38 further comprises one or more search engines 52. Such search engines may be local, or remote and accessed online, and/or may be tools in a dedicated system. For example, search tools available based on an open-source information retrieval software library such as Apache Lucene, available from sources such as Elasticsearch, have been shown to provide rapid and reliable searching, although other sources and tools may be used. In some embodiments, the search engine will construct or receive searches defined by criteria of interest to a user, and particularly as defined by one or more filters 54. For example, the search may reference the index or individual of interest, dates, data sets, sources, or any other metadata available, and may reference all or only part of the documents or annotated data based upon one or more selected filters. Based upon the search criteria, the search engine accesses and acts on the index, and where an inverted index is provided, may advantageously access the data from this index to identify and select documents corresponding to search criteria, and to produce variation search results 56. Such search results may be provided as a data structure that can be stored, captured, and transmitted, at least in part, to users via the genomic browser described herein. The search results may then be transmitted to a server/interface 58 of the system to permit delivery to a user at a workstation, and particularly to a genome browser instantiated and running on the workstation 42. In the embodiment depicted in FIG. 2, the same server receives the search request from the workstation, and provides the results via the genome browser. Some embodiments can also include multiple servers, various network architectures, and various or disparate participants providing the functionality described. In some embodiments, the searching is distributed across multiple servers to enhance performance.

In some embodiments, the workstation 42 provides a primary interface for the user, and may comprise a general-purpose computer, laptop, tablet, smartphone, or any other workstation allowing the user to access the whole genome variation data as described herein. In the illustrated embodiment, a genomic browser 44 runs on the workstation, and this may comprise any suitable interface, typically a web interface using pages, images, video, hyperlinks, and other tools that can be displayed and used for interaction by the user. In some embodiments, the browser may include filters and selection tools 60 for defining the searches desired by the user. One or more inputs or pages of the browser may allow for selection of a particular index 62 such as an index relating to an individual, search identifications, interface identifications such as sessions, new or saved searches, or any other metadata that is useful for initiating, performing, and tracking or reviewing reports of search results. Variation report page definitions 64 may also be included for viewing and summarizing the search results. In some embodiments, a various interaction or visualization tool 66 may be provided that permit a number of highly instructive and useful activities with the search results, such as "zooming", highlighting, access to additional details on the variations, and so forth, as described herein.

Figure 3:
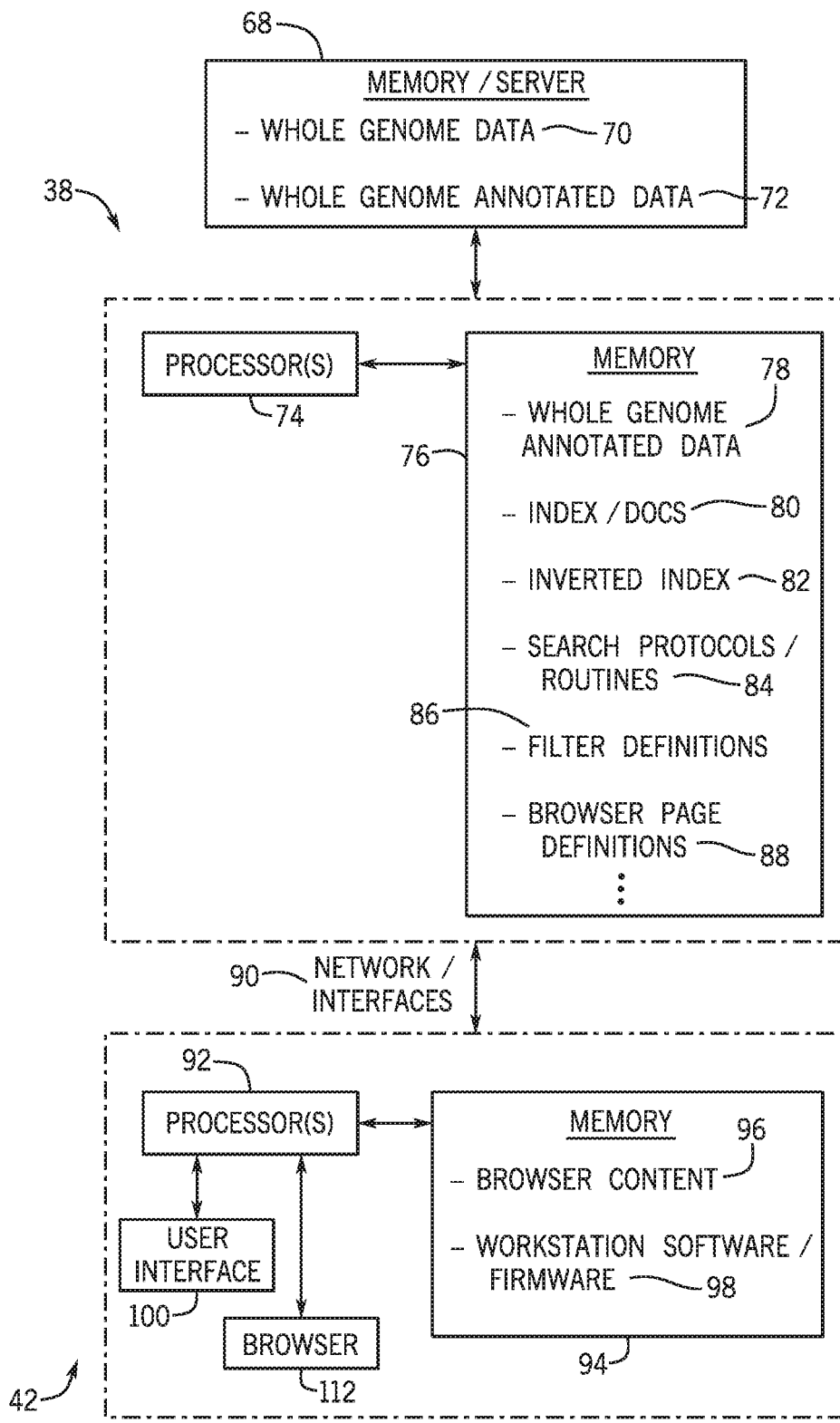
FIG. 3 depicts embodiments of certain components of the system of FIG. 2.

An embodiment of functional components of the system 38 and the workstation 42 are depicted in FIG. 3. The system 38 may access one or more memory devices or servers 68 where the whole genome data 70 or the whole genome annotated data 72, such as data summarizing the variations identified, is stored. Such resources may be local or remote, for example, within an organization, in a cloud-based service or repository, or provided on pay-per-use or subscription basis. In some embodiments, the data is stored in an access-controlled repository to limit access and use to certain users or classes or users, and for certain controlled purposes. The system 38 may include one or many processors 74 that may form part of a general-purpose computing system. In some embodiments, the processors may be provided in servers or other computers designed to provide web access and interaction, as well as to perform the sophisticated searching and results delivery contemplated. The processor(s) will access memory 76, which here again may be of any suitable type, and provided at one or more locations. In some embodiments, the memory may store many different types of data, including data acted upon, as well as routines for performing searches and delivering results. In FIG. 3, the data may include whole genome annotated data 78 (similar or identical to data 72, or only part of such data), the index or indices and documents comprising these, as indicated by reference numeral 80. The memory may also store search protocols and routines 84 which may be provided in a single physical system, or as an outsourced service. Filter definitions 86 and browser page definitions 88 may also be stored, and these may be the primary basis for the pages delivered to the genome browser. In some embodiments, such filters and web pages will be pre-defined to have a desired look and feel, and to provide all or most of the options anticipated for whole genome variation visualization and analysis. Other, altered, or new filters and pages may, of course be added to these as improved techniques or data is available, or when new insights are determined to offer advantages to users of the system.

In some embodiments a set of networks and interfaces 90 allow for interaction between the system 38 and the many workstations 42 that may use the whole genome variation data. Such networks may include open networks such as the Internet, as well as internal networks, controlled-access networks, or networks accessed in accordance with any desired business scheme.

In some embodiments, the workstation 42 can include one or more processors 92, as well as memory 94. The processors may utilize any desired operating system, and interact with the memory to access browser content 96, as well as any other workstation software or firmware 98. A user interface 100 (e.g., monitor, touch screen, keyboard) is present in the workstation, as well as a browser 112 for displaying the genome data.

Figure 4:
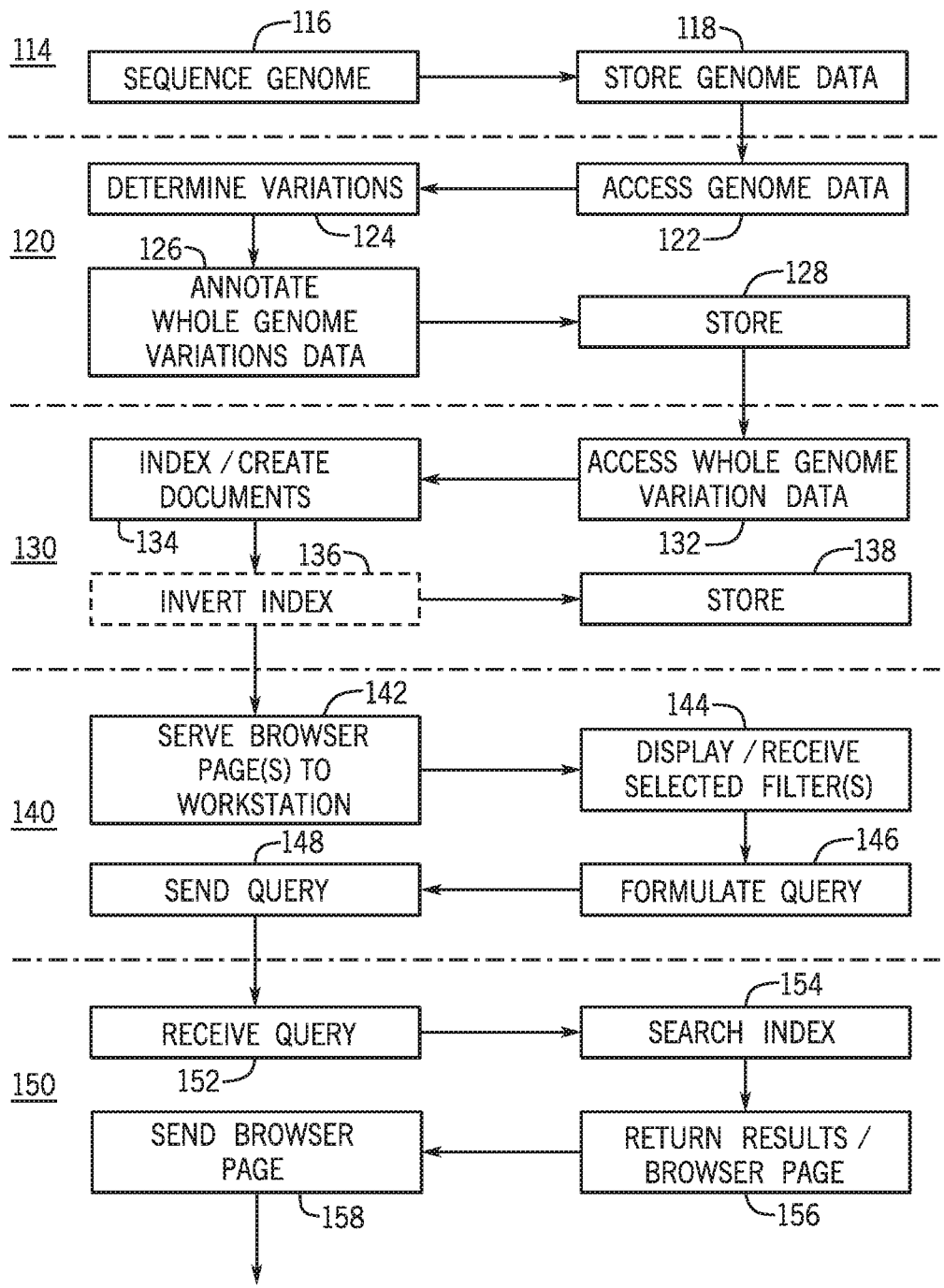
FIG. 4 is a flow chart illustrating example logic in obtaining and analyzing genetic information via the system.

An embodiment of a work flow for carrying out the operations of analyzing and reporting searches of whole genome variation data is depicted in FIG. 4. In some embodiments, a workflow or "pipeline" includes accessing whole genome data produced by primary analysis software such as real-time analysis software which analyzes image data produced by a genetic sequencing system, aligning the genomic data with an aligner such as with secondary analysis tools, such as Isaac (Illumina, Inc., San Diego, CA), calling variants using one or more variant callers such as Manta (Illumina, Inc., San Diego CA), then annotating the call data using an annotation program such as Nirvana. Each stage produces a file, which is used as input to the next stage. Other workflows and tools may, of course be used.

In an initial stage 114 illustrated in FIG. 4, the genome of the subject of interest is sequenced, as indicated by reference 116, and the resulting whole genome data is stored as indicated at 118. In an annotation stage, the whole genome data is accessed at 122, such as from a data repository, cloud-based resource, or any other location. The accessed data is then analyzed, such as by variant calls by one or more "callers" as indicated by reference 124 to identify the variations in the whole genome. Data identifying these variations is thus created as annotated whole genome variation data 126, which may include metadata regarding the individual, as well as many different types of data relating to the particular structural variants, their locations, types, likelihood of reliability of the calls, and so forth. As noted herein, one or more tools may be used for this purpose, and in some embodiments such redundancy may be later used to enhance reliability of the information. The whole genome variation data may then be stored as indicated at 128, such as persistently or temporarily, such as documents in the index as the index is created.

An indexing stage 130 is then performed on the annotated data resulting from the variation analysis on the whole genome data. This process includes accessing the whole genome variation data as indicated by 132, and indexing the data to create documents for searching—such as one document for each variant identified, as indicated at 134. In some embodiments, various tools may be used to create the index and to define or refine the data associated with each document, how the data is formulated or encoded, and so forth. In some embodiments, where desired the index, once created, may be inverted, as indicated at 136 to facilitate rapid and accurate searching of multiple fields or data points in each document.

In a query stage 140, then, the user operating at a workstation may access the one or more servers hosting a site of the genomic information, and browser content is served including one or more pages to the workstation, as indicated at 142. The genomic browser content is then received and displayed at 144, along with locations for inputting access codes, metadata defining a search, and so forth, as well as search criteria. These criteria may be at least partially defined by one or more filters. Based upon the input data, a search or query is formulated at 146, and at 148 the query is transmitted to the server.

In a search stage 150, the query is received and analyzed to identify the index to be searched, and the criteria to be employed. In some embodiments, one or multiple operations may be performed to verify the rights of the user to access the index, to perform the search, and so forth. Once the query is received at 152, the server or an associated computer performs a search of the identified index at 154 and returns search results at 156, such as in the form of a genomic browser page. This browser page is then returned to the workstation at 158 where it can be viewed, interacted with, used to formulate additional searches or access additional data, and so forth.

Figure 5:
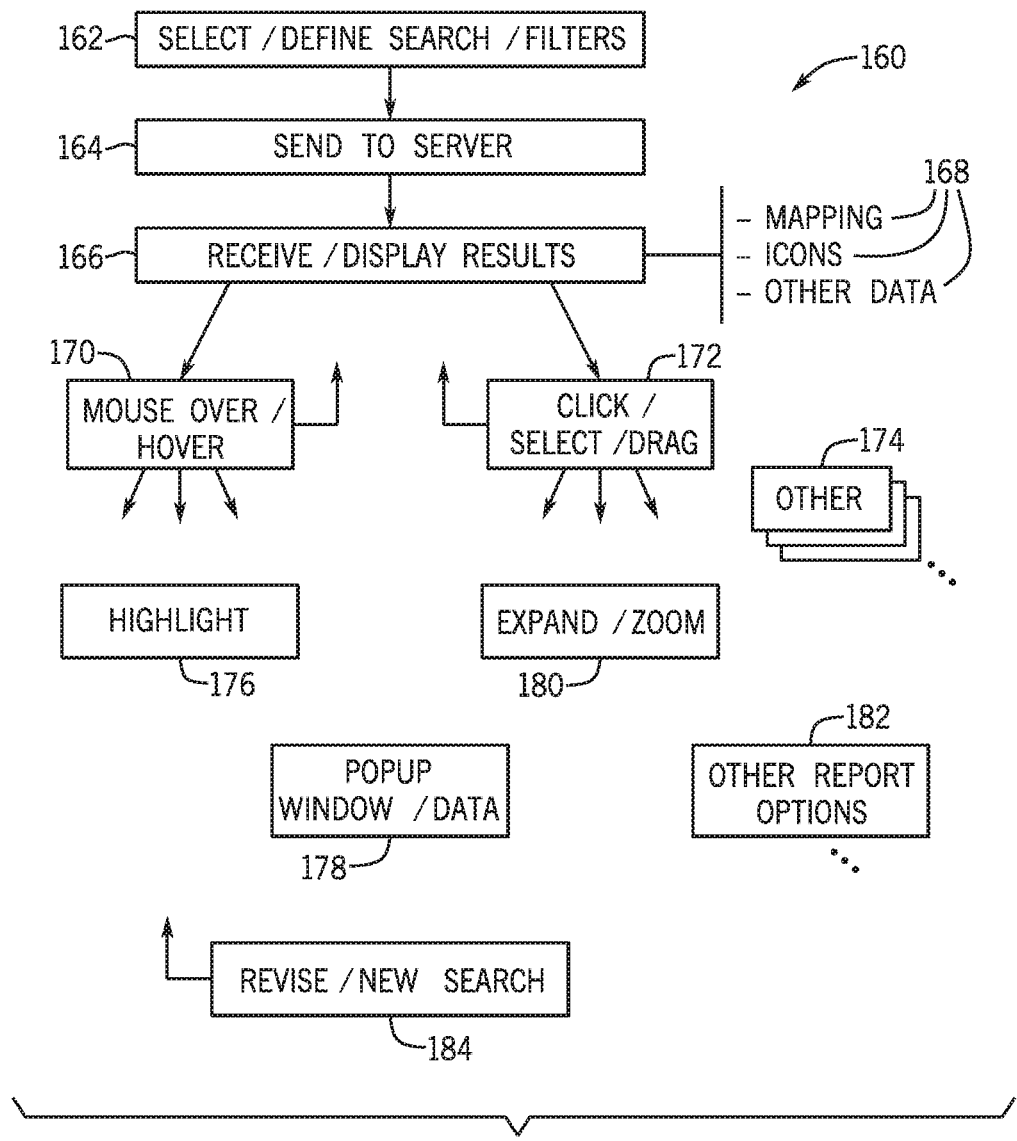
FIG. 5 is a flow chart illustrating example logic in searching and reporting genetic information via the system.
Figure 6A:
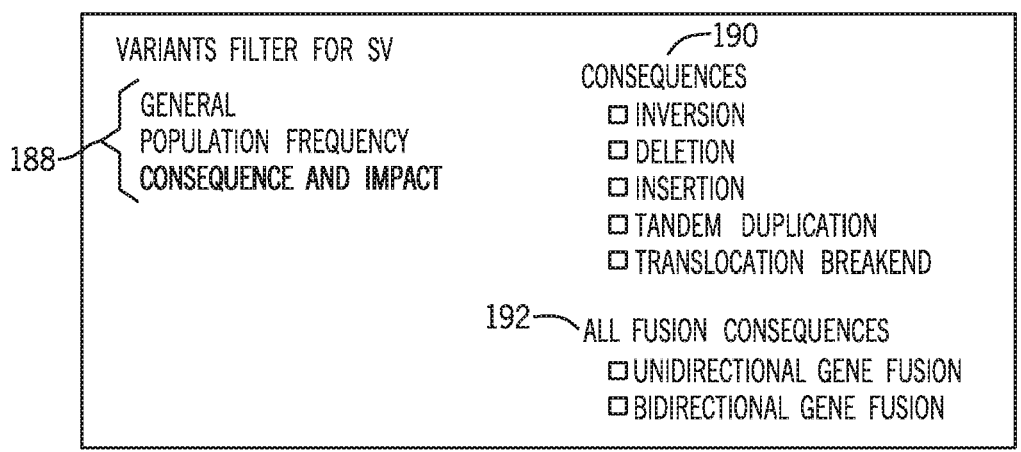
FIG. 6A depicts a portion of a browser screen including a filter selection window that includes general filters, consequences filters, and all fusion consequences filters.
Figure 6B:
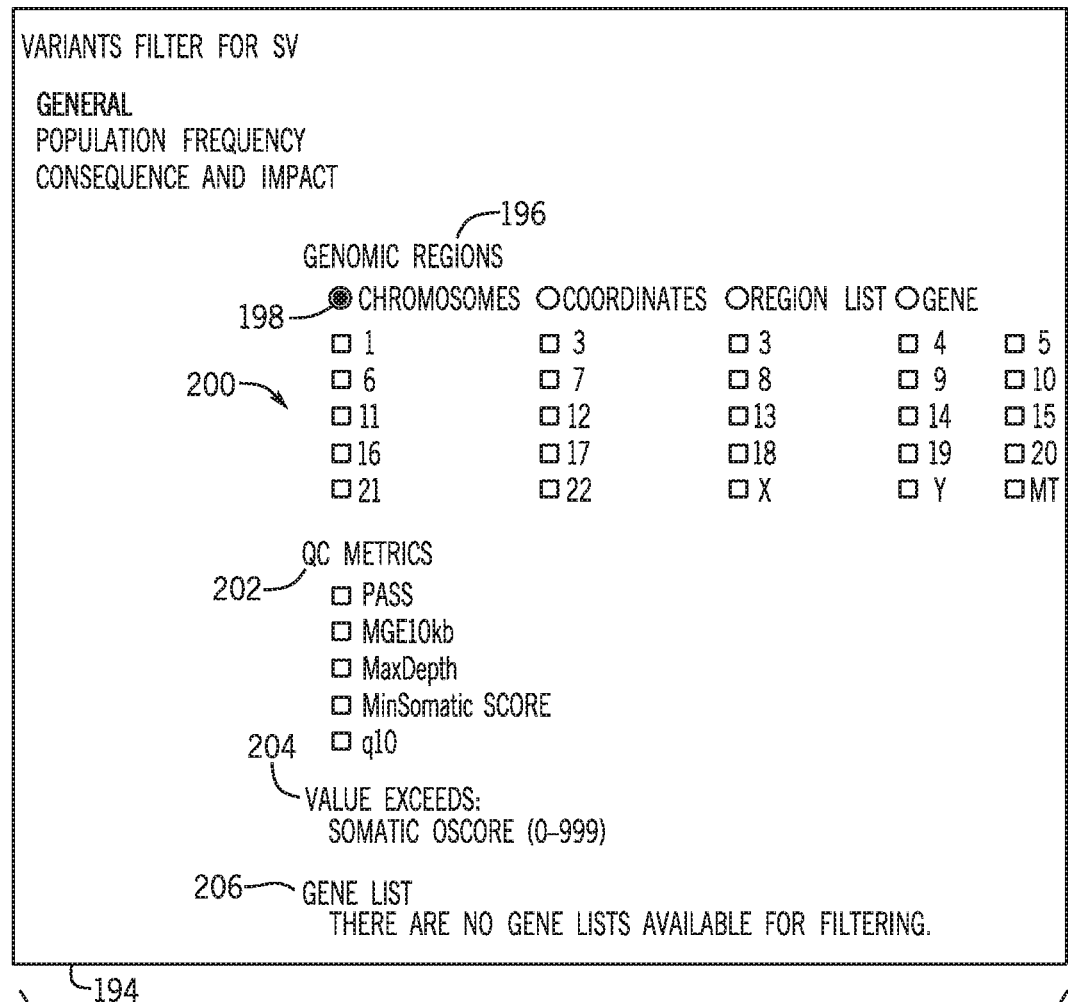
FIG. 6B depicts a portion of a browser screen including a filter selection window that includes filters for selecting specific genomic regions.

An embodiment of operations that may be performed on the workstation based on the whole genome variation data searching via a genomic browser is depicted in FIG. 5. The operations, indicated by reference 160 may include defining a search, such as by selecting one or more indices, and one or more filters, as indicated at 162. Embodiments of filters are depicted in FIGS. 6A-6C and described herein. Based upon the search definition, the workstation sends the query at 164. Once the search has been performed and the results returned, such as in the form of genomic browser content, the results are received and displayed at 166.

In some embodiments, the utility of the genomic browser is enhanced by certain reporting and visualization technologies that leverage the fact that the annotated data, the index, the searching and the reporting are based on whole genome variation data. As indicated at 168, the results of the searching may include useful mapping of variations along axes that indicate a locus of the variation, loci of break-ends such as for translocations, chromosomes and regions where structural variations are detected, and so forth. In some embodiments, unique icons or symbols may be used for different types of structural variation, and such icons may be placed on the mapping to usefully locate these in the genome or portions of it. In some embodiments, other data may also be provided, and some of these may be along parallel axes to aid in understanding where and how the variations occur, the quality of calls of the variations, and so forth.

In some embodiments, other operations may be usefully performed by using workstation input devices. Workstation input devices may include any mechanism or combination of mechanisms that permit a user to input information to the workstation. For example, the workstation input devices can include a keyboard, a mouse, a touch sensitive display device, a microphone, a pen-based pointing device, wireless input device such as those that use Bluetooth and or infrared communication protocols, and/or a biometric input device, such as a voice recognition device and/or a finger print scanning device. These devices can be used to interact with the browser content, such as via "hovering" over a feature with a cursor or pointer, as indicated at 170, by clicking, selecting, dragging, expanding, shrinking, moving, and any other useful operation, as indicated at 172 and 174 in FIG. 5. Based upon such operations, analysis and/or visualization techniques may include highlighting of features or relationships, as indicated at 176, presenting additional information or details about one or more selected variations at 178, expanding or zooming (in or out) on one or more aspects of the presentation or mapping, at 180, accessing one or more other reporting options at 182. From any of these steps the user may return to other pages or information, or may perform new or refined searches, as indicated at 184.

It has been found that the foregoing techniques allow for very rapid access to whole genome variation data and searching. Indeed, searches may be performed and results returned so quickly that in a single session many different searches and filters may be applied, and many details retrieved to provide greatly enhanced utility and interactivity with the data. Here again this is particularly useful insomuch as the data allows for analysis of the whole genome of the individual, and not just a part of it.

In some embodiments, any number of re-set searches and filters may be used to assist in focusing the search and results on particular features of interest. In some embodiments, such searching may include filtering by chromosome, coordinates, regions, region lists, genes, gene lists, and the like. Moreover, filtering may be performed on quality control metrics, such as quality filters and scores, such as somatic quality scores. Indeed, any of the annotated data may form the basis of filters, such as Database of Genomic Variants (DGV) and 1000 genome population frequency data, ClinGen pathogenicity assignment data, and so forth. Filters may also include consequence and types of structural variation, such as inversions, deletions, insertions, tandem duplication, translocations, gene fusions, unidirection gene fusions, bidirectional gene fusion, and so forth.

Embodiments of portions of browser pages that include selection of such filters are depicted in FIGS. 6A-6C. In FIG. 6A, a filter selection window identifies a general type or class of filters at 188, and different "consequences" filters at 190. The user may select one or more of these by selecting an associated location or box. An "all fusion consequences" set of filters is also provided in this example, as indicated at 192. In FIG. 6B, a further filter selection window 194 provides a number of filters for selecting specific genomic regions 196, including classes of filters by the type of region, as indicated by reference 198. Where desired, a user may select one or more specific chromosomes, as indicated by 200. Quality metrics may be filtered, as indicated by 202, such as by reference to metadata indicating quality scores for the calls, as well as levels of quality score, as indicated at 204. In some embodiments, the window may offer specific lists of genes, as indicated at 206 (although in this example no gene lists were available). FIG. 6C shows another filter selection window 208 where the user may select various population filters, ClinGen filters, and population frequency filters. It should be noted that the filters illustrated, and any other filters available may be "stacked" or combined so that searching and results returned will be based upon intersection sets of data (documents or variations) responding positively to all selected filters. The filters thereby represent a powerful tool for understanding the whole genome variation data, particularly when coupled with rapid searching and reporting technologies.

An embodiment of a presentation of mapping of the occurrence of genomic variations along the whole genome is depicted in FIG. 7. Such mappings may be provided, along with other data, mappings, metadata, and so forth in the genomic browser pages. In FIG. 7, the mapping 212 includes an indication of the genome, as indicated at 214, along with a locus axis 216 to indicate the likely locus of each variation. For certain types of structural variation, the mapping may include a second axis 218 that indicates a second locus related to the variation. By way of example, for translocations, the first axis 216 may identify a locus of a variation break-end, and the second axis 218 may indicate the locus of a matching break-end. A straight or curved line 220 may join the loci to aid in understanding the translocation. In some embodiments, such curves are automatically drawn as Bezier curves joining the two break-ends.

Indeed, it should be noted that in some embodiments, the display or visualizations are automatically generated by the code defining the genomic browser pages. That is, the returned data may define many different structural variations, and the data of each document corresponding to respective variations may define the type of variation and its locus in the whole genome, in regions, chromosomes, and so forth. This data is used to automatically populate the mappings and to provide the visual cues illustrated and described herein. Then for certain user interactions, additional functionality may be provided as described herein. For example, by hovering a cursor over a specific variation or relationship, one or more of these may be highlighted, as illustrated at 222 in the "zoomed" view 226 of FIG. 7. In some embodiments, zooming in and out may be performed in similar ways. In an embodiment depicted in FIG. 8, a translocation also shown in FIG. 7 has been selected as indicated at 222, and a "zooming" operation has been performed to present the locus axis 216 in greater detail or resolution. In some embodiments, such zooming may be selective so that the upper axis 218 is not zoomed, providing a clear indication of one break-end along the lower axis, but of the matching translocation locus along the entire genome by virtue of the "unzoomed" upper axis 218.

Some embodiments also include interactive features, such as the use of unique icons for different types of structural variation, and placement of these icons in the same mapping of the whole genome. For example, as shown in FIG. 8, icons 228 and 230 may be designated for different types of variation, and these are placed along the mapping axis (or multiple axes). Moreover, additional data may be similarly placed and referenced by location along the axis, such as count variations, and so forth. Advantageously, these can be "stacked" so that many different types of information and detail may be provided in the same view. It should be noted, of course, that when a user performs additional searches, or applies different filters, the data will in most cases change, as will the automated visualization of the results.

Figure 9:
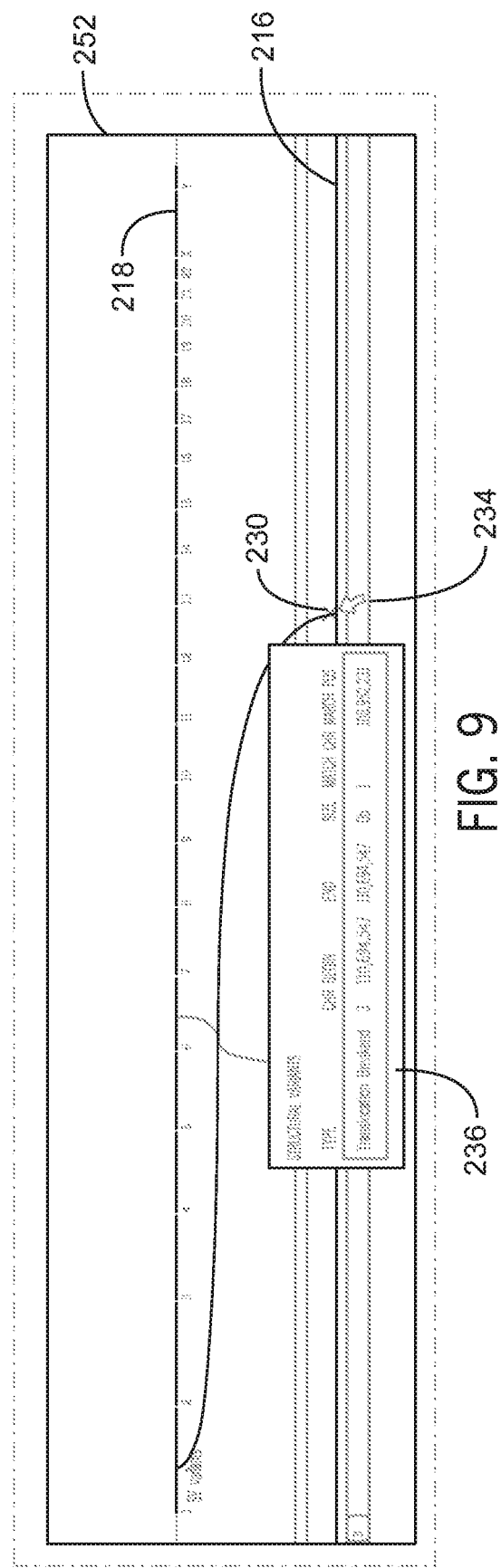
FIG. 9 depicts a portion of a browser page that includes a magnified view of a portion of the browser page depicted in FIG. 8 and includes and a popup window displaying information for a structural variant.
Figure 10:
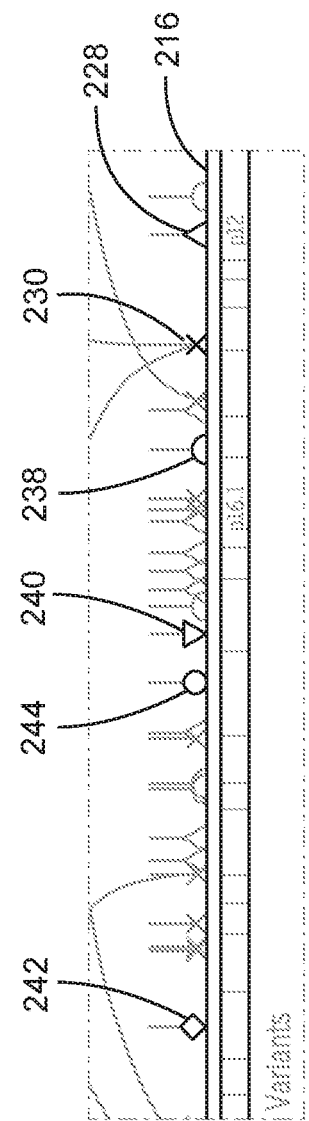
FIG. 10 depicts a portion of a browser page that includes a magnified view of a portion of the browser page depicted in FIG. 9 and includes distinct icons for various types of identified genetic variants.
Figure 11:
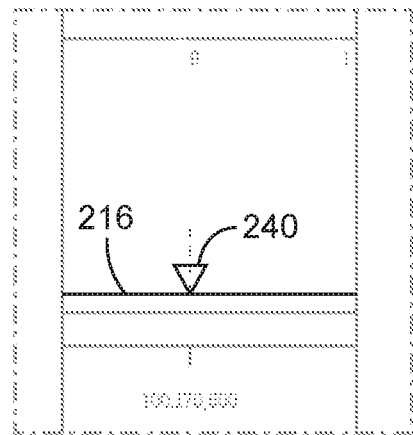
FIG. 11 depicts a portion of a browser page that includes a magnified view of a portion of the browser page depicted in FIG. 10 and includes an icon for an identified genetic variation shown as an inverted triangle.
Figure 12:
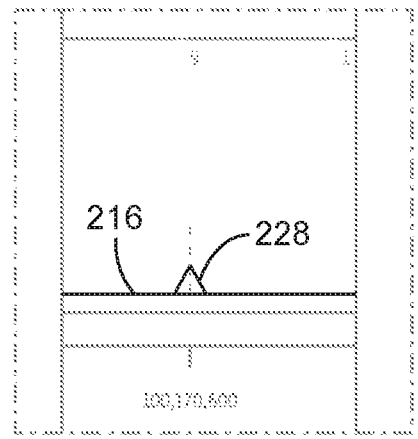
FIG. 12 depicts a portion of a browser page that includes a magnified view of a portion of the browser page depicted in FIG. 10 and includes an icon for an identified genetic variation shown as a triangle.
Figure 13:
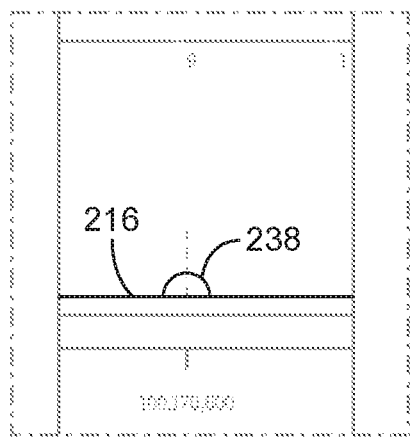
FIG. 13 depicts a portion of a browser page that includes a magnified view of a portion of the browser page depicted in FIG. 10 and includes an icon for an identified genetic variation shown as an inverted semi-circle.
Figure 14:
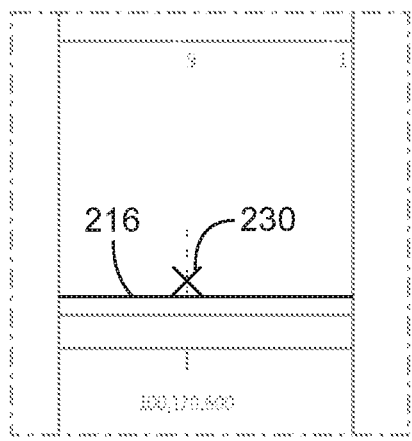
FIG. 14 depicts a portion of a browser page that includes a magnified view of a portion of the browser page depicted in FIG. 10 and includes an icon for an identified genetic variation shown as a cross.
Figure 15:
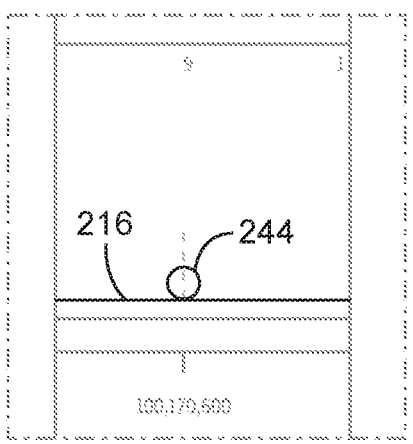
FIG. 15 depicts a portion of a browser page that includes a magnified view of a portion of the browser page depicted in FIG. 10 and includes an icon for an identified genetic variation shown as a circle.
Figure 16:
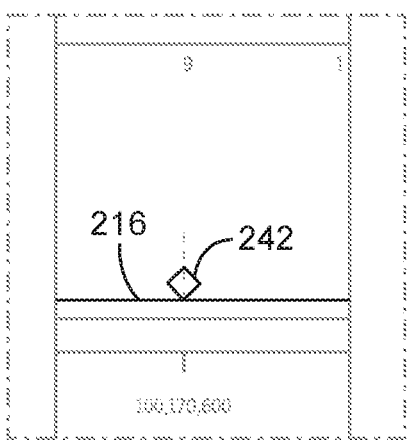
FIG. 16 depicts a portion of a browser page that includes a magnified view of a portion of the browser page depicted in FIG. 10 and includes an icon for an identified genetic variation shown as a diamond.

An embodiment of a highly useful tool for a whole genome variation browser includes a "popup" window that provides additional information is depicted in FIG. 9. In FIG. 9, window 232, the same variation 230 as indicated in the preceding view of FIG. 8 has been selected and highlighted, mapping a relationship between the upper and lower locus axes 216 and 218. However, in this case a user has hovered over or selected an icon 230 associated with a particular type of structural variation (in this case a translocation). Such selection, as indicated by the positioning of the cursor 234 caused the browser to access details on the particular variation selected, and to present the information in a "popup" window 236. In some embodiments, any other tool or presentation may be used, such as a separate browser page, textual data, mappings, insets, links to other files or documents, and so forth.

In some embodiments, icons may be used to indicate characteristics of the identified structural variations along the whole genome or part of the genome. FIGS. 10-16 illustrate embodiments of icons for this purpose. As shown in these figures, different simple, easily recognized shapes may be used for variation types, such as inversions, deletions, insertions, duplications, translocations, fusions, and so forth. In the illustrated examples, the icons or symbols are indicated by reference numerals 228, 230, 238, 240, 242 and 244. These may be selected automatically by the code defining the browser content (e.g., a defined shape selected by reference to the search result data identifying the variation type). The icons may then be automatically positioned along one or more of the mapping axes, such as axis 216 in the illustrated example.

Certain Methods

Some embodiments include a method for the analysis and the display of genetic variation data. Some such embodiments include computer-implemented methods. Some embodiments include displaying a summary of certain genetic variants of an individual. In some embodiments, the summary can be displayed on a display device, on a screen, in a window, in a browser, in a browser page. In some embodiments, the summary can include a first map comprising a first axis comprising a linear representation of a genome, such as a genome of the individual. Certain genetic variants identified in the individual can be mapped on the first map, and different types of genetic variants can be identified by different icons. Examples of different genetic variants include inversions, deletions, insertions, duplications, substitutions, and translocations.

In some embodiments, a genetic variant comprises a translocation. A translocation is the rearrangement of a portion of a chromosome with a nonhomologous location within a genome. A translocation includes a first breakpoint at an original location in a genome and a second breakpoint at a new location in the genome. In an unarranged genome, sequences juxtaposed to the breakpoints would be contiguous with each other. In some embodiments, a genetic variant comprising a translocation can be identified in the summary by a straight or curved line that joins the location of the first breakpoint of the translocation on the first axis, with the location of the second breakpoint of the translocation mapped on a second axis comprising a linear representation of a genome. An embodiment is depicted in FIG. 7 at 222.

In some embodiments, a portion of the summary can be presented in a display of a second map. In some embodiments, the second map can be reached directly from the first map. In some embodiments, an icon identifying a genetic variant in the first map can be selectable to launch a display of the second map and display further data associated with the selected icon. In some embodiments, each icon identifying a genetic variant in the first map can be selectable to launch a display of the second map and display further data associated with the selected icon.

In some embodiments, a straight or curved line that joins the location of the first breakpoint of the translocation on the first axis, with the location of the second breakpoint of the translocation mapped on a second axis comprising a linear representation of a genome in the first map can be redrawn in the second map. An embodiment is depicted in FIG. 8 at 222. The second map can include an enlarged view of the first axis, and a non-enlarged view of the second axis. In some embodiments, this selective enlargement can provide a more detailed view of genetic variant information mapped on the first axis, while providing the context of related translocation information mapped to both the first axis and the second axis. Some embodiments also include highlighting a translocation when a user hovers over or selects a corresponding translocation. Some embodiments also include displaying a popup window of details of a genetic variant when a user selects the icon for the genetic variant.

Prior to presenting a summary of certain genetic variants of an individual, some embodiments include obtaining the summary of certain genetic variants of an individual. Some such embodiments can include determining genetic variation data from genomic sequence data from an individual. For example, genomic sequence data can be obtained from an individual, and genetic variants in the genomic sequence data can be determined. In some embodiments, determining genetic variation data can include the use of various tools, for example by calling a plurality of variant identification tools. Some embodiments also include creating annotated genetic variation data with the variation identification tools. In some embodiments, the annotated genetic variation data can include a type of genetic variant, a locus of a genetic variant, and/or a quality score for a genetic variant. Some embodiments include creating an index of documents for the determined genetic variation data. In some embodiments, the index can be an inverted index.

Some embodiments include identifying a genetic variant that is a translocation along with a first and second point, the first point being the location of a first breakpoint of the translocation on a first axis, and the second point being the location of a second breakpoint of the translocation mapped on a second axis comprising a linear representation of a genome. Some embodiments include identifying a plurality of translocations along with the first and second point associated with each translocation. Some embodiments include generating an index for the plurality of translocations along with the first and second point associated with each translocation.

Some embodiments include presenting a user with a selection of filters related to features of interest in the genetic variation data. In some such embodiments, the filters can selectively provide genetic variant data associated features including the association of certain variants in a whole genome, a chromosome, or a portion of a chromosome; a type of genetic variant, a quality metric, a clinical indication, a population frequency, and an overlapping database variant. In some embodiments, a clinical indication can be associated with a phenotype for a certain genetic variant. In some embodiments, a selection of one or more filters can be received from the user. In some embodiments, the index or inverted index can be searched using the selected filter. In some embodiments, a summary of the filtered genetic variants of the individual can be provided. In some such embodiments, the summary of filtered genetic variants of an individual can be presented as described herein. In some embodiments, the summary can be presented on a display device, on a screen, in a window, in a browser, in a browser page.

Some embodiments include a computer-implemented method for displaying genetic variation data comprising receiving genetic variation data from genomic sequence data of an individual; creating an index of documents for the determined genetic variation data; receiving a selection from a user for at least one filter from a plurality of filters for features of interest in the genetic variation data; searching the index based upon the selected filter to generate filtered genetic variants for the individual; identifying a genetic variant that is a translocation along with a first and second point, the first point being the location of a first breakpoint of the translocation on a first axis, and the second point being the location of a second breakpoint of the translocation mapped on a second axis comprising a linear representation of a genome; and displaying on a display device a browser page that displays the filtered genetic variants of the individual, wherein the browser page comprises a first map comprising the first axis comprising a linear representation of a genome having the locations of the genetic variants mapped thereon, and wherein different types of genetic variants are identified by different icons, wherein for translocation genetic variants, the browser page displays the first and second point connected using a straight or curved line. Some embodiments also include determining the genetic variation data from the individual.

Certain Systems

Some embodiments include a system for the display and analysis of genetic variation data. Some such embodiments include electronic systems. Some embodiments include an informatic module, such as an informatic module running on a processor, adapted to determine genetic variation data from genomic sequence data from an individual. In some embodiments, the informatic module is adapted to call a plurality of variant identification tools. In some embodiments, the variation identification tools create annotated genetic variation data and can include a type of genetic variant, a locus of a genetic variant, and a quality score for a genetic variant.

Some embodiments include an indexing module adapted to create an index of documents for the determined genetic variation data. In some embodiments, the indexing module adapted to create an inverted index.

Some embodiments include a selection module adapted to present a browser comprising a plurality of filters available for features of interest in the genetic variation data, and to receive a selection from a user for at least one filter from the plurality of filters. In some embodiments, the filters can selectively provide genetic variant data associated features including the association of certain variants in a whole genome, a chromosome, or a portion of a chromosome; a type of genetic variant, a quality metric, a clinical indication, a population frequency, and an overlapping database variant. In some embodiments, a clinical indication can be associated with a phenotype for a certain genetic variant.

Some embodiments include a search module adapted to search the index based upon the selected filter, and to generate filtered genetic variants for the individual. In some embodiments, the search module is adapted to search the inverted index.

Some embodiments include an identification module adapted to identify a genetic variant, such as a translocation. In some embodiments, the identification module identifies a translocation along with a first and second point, the first point being the location of a first breakpoint of the translocation on a first axis, and the second point being the location of a second breakpoint of the translocation mapped on a second axis comprising a linear representation of a genome. Some embodiments include the identification of a plurality of translocations along with the first and second point associated with each translocation. Some embodiments include generating an index for the plurality of translocations along with the first and second point associated with each translocation.

Some embodiments include a browser module adapted to return a browser page that displays genetic variants responding to the selected filter, such as filtered genetic variants of the individual. In some embodiments, the returned browser page provides a first map comprising a first axis comprising a linear representation of a genome having the locations of the genetic variants mapped thereon, wherein different types of genetic variants are identified by different icons. In some embodiments, a genetic variant comprising a translocation is identified by a line or curve that joins the location of a first breakpoint of the translocation on the first axis, with the location of a second breakpoint of the translocation mapped on a second axis comprising a linear representation of a genome. In some embodiments, the returned browser page provides a second map comprising an enlarged view of the first axis, and a non-enlarged view of the second axis. In some embodiments, the returned browser page highlights the translocation when a user hovers over or selects a corresponding translocation. In some embodiments, the second map can be reached directly from the first map. In some embodiments, an icon identifying a genetic variant in the first map can be selectable to launch a display of the second map and display further data associated with the selected icon. In some embodiments, each icon identifying a genetic variant in the first map can be selectable to launch a display of the second map and display further data associated with the selected icon. In some embodiments, the returned browser page provides a popup window of details of a genetic variant when a user selects the icon for the genetic variant.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

What is claimed is:

1. A computer-implemented method for displaying genetic variation data, comprising using a processor for:
   receiving genetic variation data from genomic sequence data of an individual;
   determining annotated genetic variation data for the individual from the received genetic variation data using a plurality of variant identification tools, wherein the annotated genetic variation data comprises at least one feature selected from the group consisting of:
   a type of genetic variant, a locus of a genetic variant, and a quality score for a genetic variant, and wherein genetic variants in the annotated genetic variation data comprise at least one structural variant;
   creating a data structure of an index of documents for the annotated genetic variation data in a computer memory, wherein creating the index data structure comprises creating an inverted index data structure;
   receiving a selection from a user for at least one filter from a plurality of filters for features of interest in the annotated genetic variation data; and
   in response to receiving the selection,
      searching the index data structure based upon the selected filter to generate filtered genetic variants for the individual, wherein searching the index data structure comprises searching the inverted index data structure;
      identifying a genetic variant that is a translocation along with a first and second point, the first point being the location of a first breakpoint of the translocation on a first axis and the second point being the location of a second breakpoint of the translocation mapped on a second axis comprising a linear representation of a genome;

displaying on a display device a browser page that displays the filtered genetic variants of the individual, wherein the browser page comprises a first map comprising the first axis comprising a linear representation of the genome having the locations of the genetic variants mapped thereon, and wherein different types of genetic variants are identified by different icons, wherein for the translocation, the browser page displays the first and second points connected using a straight or curved line;

in response to the user further selecting an icon corresponding to the translocation, launching and displaying on the display device a second map comprising an enlarged view of the first axis and a non-enlarged view of the second axis to provide a higher resolution visualization of the first breakpoint of the translocation while maintaining a visualization of the association of the translocation with its second breakpoint at the second point within the genome; and in response to hovering a mouse cursor over or to selecting an icon, displaying details of the translocation in a popup window.

2. The method of claim 1, wherein the second map is reached directly from the first map.

3. The method of claim 1, further comprising highlighting a translocation when a user hovers over or selects a corresponding icon.

4. The method of claim 1, further comprising displaying a popup window of details of a genetic variant when a user selects the icon for the genetic variant.

5. The method of claim 1, wherein the genetic variation data is stored at a location remote from a server that performs the search.

6. The method of claim 1, wherein the filters selectively provide genetic variants associated with at least one feature selected from the group consisting of a whole genome, a chromosome, a type of genetic variant, a quality metric, a clinical indication, a population frequency, and an overlapping database variant.

7. The method of claim 6, wherein the clinical indication is a phenotype associated with a genetic variant.

8. The method of claim 1, wherein the genetic variants comprise at least one variant selected from the group consisting of an inversion, a deletion, an insertion, a duplication, a substitution, and a translocation.

9. The method of claim 1, wherein each of the genetic variants are uniquely identified by one of the different icons.

10. The method of claim 9, wherein the genetic variants comprise at least one variant selected from the group consisting of an inversion, a deletion, an insertion, a duplication, a substitution, and a translocation.

11. The method of claim 10, wherein the icons are selected from the group consisting of: a semi-circular shape, a triangular shape, an inverted triangular shape, a circular shape, a cross shape, and a diamond shape.

12. The method of claim 1, wherein the browser page further displays a Bezier curve joining an expected locus and an actual locus of the translocation.

* * * * *

UNITED STATES PATENT AND TRADEMARK OFFICE
CERTIFICATE OF CORRECTION

| | | |
|---|---|---|
| PATENT NO. | : 12,437,844 B2 | Page 1 of 1 |
| APPLICATION NO. | : 16/495015 | |
| DATED | : October 7, 2025 | |
| INVENTOR(S) | : Andrew Warren | |

It is certified that error appears in the above-identified patent and that said Letters Patent is hereby corrected as shown below:

In the Specification

In Column 1, Line 11, delete "2018" and insert -- 2017 --, therefor.

Signed and Sealed this
Eighteenth Day of November, 2025

John A. Squires
*Director of the United States Patent and Trademark Office*